United States Patent [19]

Becker

[11] Patent Number: 4,501,437
[45] Date of Patent: Feb. 26, 1985

[54] LOAD TRANSFER AXLE ASSEMBLY

[75] Inventor: David A. Becker, White Bear Lake, Minn.

[73] Assignee: Dorso Trailer Sales, Inc., Minneapolis, Minn.

[21] Appl. No.: 487,293

[22] Filed: Apr. 21, 1983

[51] Int. Cl.³ .............................................. B60G 9/02
[52] U.S. Cl. ............................... 280/704; 180/24.02; 180/209; 280/43.23; 280/81 R; 280/767
[58] Field of Search ..................... 280/704, 711, 81 R, 280/43.23, 764.1, 767; 180/24.02, 209

[56] References Cited

U.S. PATENT DOCUMENTS

| | | | |
|---|---|---|---|
| 3,112,100 | 11/1963 | Prichard | 366/41 |
| 3,133,745 | 5/1964 | Granning | 280/112 R |
| 3,161,418 | 12/1964 | Brennan et al. | 280/81 R |
| 3,191,961 | 6/1965 | Brennan et al. | 280/81 R |
| 3,246,884 | 4/1966 | Prichard et al. | 366/41 |
| 3,317,193 | 5/1967 | Buelow et al. | 366/68 |
| 3,479,049 | 11/1969 | Duecy | 280/81 R |
| 3,610,653 | 10/1971 | Derrwaldt | 280/81 R |
| 3,685,853 | 8/1972 | Goldsmith | 280/81 R |
| 3,689,102 | 9/1972 | Granning | 280/112 R |
| 3,704,896 | 12/1972 | Buelow | 280/81 A |
| 3,713,663 | 1/1973 | Granning | 280/112 R |
| 3,747,948 | 7/1973 | Granning | 280/112 R |
| 3,912,293 | 10/1975 | Harbers | 280/81 R |
| 4,082,305 | 4/1978 | Allison et al. | 280/704 |
| 4,157,188 | 6/1979 | Sims | 280/704 |
| 4,165,792 | 8/1979 | Homl et al. | 180/24.02 |
| 4,171,830 | 10/1979 | Metz | 280/711 |
| 4,314,709 | 2/1982 | Silbernagel | 280/81 A |

OTHER PUBLICATIONS

Granning Suspensions, Inc. Prints for Air Suspension Assembly (Part Numbers 9103 and 9067).

Primary Examiner—Joseph F. Peters, Jr.
Assistant Examiner—Kenneth R. Rice
Attorney, Agent, or Firm—Kinney & Lange

[57] ABSTRACT

A high clearance, variable load transfer axle assembly is mounted between the forward steerable and rearward drive wheels of a transit mixer truck to selectively support a portion of the weight of the truck and its load. A drive shaft extends longitudinally beneath the truck to the rearward drive wheels, with the load transfer assembly having an auxiliary frame pivotably mounted adjacent its forward end to the truck's main frame beneath the drive shaft. Wheels are mounted on a laterally extending axle member of the auxiliary frame, and the auxiliary frame pivots on a lateral axis relative to the truck's main frame between a raised position and a lowered load support position. Variable force applicators positioned between the auxiliary frame and the truck's main frame control the pivoting of the auxiliary frame between these two positions. The laterally extending axle member is formed with a drop center portion to accommodate the drive shaft of the vehicle when the auxiliary frame is in the raised position relative the truck's main frame. The auxiliary frame has a plurality of pivot guides to limit lateral movement of the auxiliary frame relative to the vehicle.

13 Claims, 6 Drawing Figures

LOAD TRANSFER AXLE ASSEMBLY

BACKGROUND OF THE INVENTION

1. Field of the Invention

The present invention relates to auxiliary load support axle assemblies for vehicles such as transit mixers, and specifically to a variable load transfer axle assembly mounted forwardly from the rear drive wheels of such vehicles.

2. Description of the Prior Art

In the prior art numerous forms of auxiliary axles or load support dollies have been utilized in combination with vehicles to partially support the weight of the vehicle and its load. Government highway or bridge weight regulations often require a specific number of axles when a vehicle's weight exceeds a certain limit. To compensate for such regulations for vehicles whose weights vary greatly depending upon whether they are loaded or not, auxiliary trailing or "tag" axles have been utilized adjacent the rearward ends of such vehicles to provide a load-carrying additional axle. Examples of such tag axle devices (which can be selectively lowered into engagement with the ground to assist in supporting the vehicle's weight) are shown in the following U.S. Patents:

| U.S. Pat. No. | Patentee | Issue Date |
| --- | --- | --- |
| 3,112,100 | Prichard | 11/26/63 |
| 3,161,418 | Brennan et. al | 12/15/64 |
| 3,191,961 | Brennan et. al | 06/29/65 |
| 3,246,884 | Prichard et. al | 04/19/66 |
| 3,317,193 | Buelow et. al | 05/02/67 |
| 3,479,049 | Duecy | 11/18/69 |
| 3,610,653 | Derrwaldt | 10/05/71 |
| 3,685,853 | Goldsmith | 08/22/72 |
| 3,704,896 | Buelow | 12/05/72 |
| 3,912,293 | Harbers | 10/14/75 |
| 4,314,709 | Silbernagel | 02/09/82 |

All of the above patents show tag axles wherein the additional axle is provided to the rear of the drive wheels of the vehicles. Another type of tag axle design which is mounted rearwardly of a vehicle's drive wheels is made by Granning Suspensions, Inc. of Livonia, Mich. On elongated non-articulated vehicles, such a rearward placement of an auxiliary axle causes problems related to the steering and control of the vehicle, especially during cornering or turning maneuvers. An alternative placement position for an auxiliary axle is between the forward steerable wheels and the drive wheels of the vehicle. In this position on the vehicle, none of the prior art auxiliary axles can be raised to an extremely high position (as shown, for example, in U.S. Pat. No. 4,314,709 and U.S. Pat. No. 3,246,884) because of the presence of the vehicle drive shaft extending rearwardly from the motor of the vehicle to the drive wheels. The support structures or frames of the tag axles of the prior art are typically center-mounted and of such configurations as to interfere with the vehicles drive shaft. The extent of lift of an auxiliary axle placed forwardly of the rearward drive wheels of a vehicle is thus limited by the vehicle's frame and its drive shaft. An additional limitation is that some states require that each supporting axle of a vehicle be a continuous member extending laterally across the vehicle, thus preventing the use of separate stub axles on each side of the vehicle.

To compensate for the drive shaft of the vehicle, auxiliary axle assemblies placed forwardly of the rearward drive wheels have been provided with one-piece lateral axles having drop center portions to prevent interference of the auxiliary axle with the vehicle's drive shaft when the auxiliary axle is raised. Such a design also premits the auxiliary axle to be raised higher off of the ground. Such ground clearance (between the wheels of the auxiliary axle and the ground) is necessary for those times when the vehicle reaches the crest of a hill or must tranverse a ditch or gully to reach a desired location. If not enough lift is achieved, the wheels of the auxiliary axle will engage the ground and interfere with the operation of the drive or steering wheels of the vehicle. Prior art auxiliary axles were unable to obtain a clearance of greater than $6\frac{3}{4}$ inches for the lowermost portion of the wheels on the auxiliary axle. In many instances, that is simply not sufficient clearance for the vehicle to operate effectively.

SUMMARY OF THE INVENTION

The present invention provides a simple and durable auxiliary axle assembly for use on a vehicle to selectively provide additional weight support. The invention, for use on a vehicle of the type having a main frame supported by forward steerable and rearward drive wheels with a drive shaft extending longitudinally beneath the vehicle from a forwardly placed motor to the rearward drive wheels, includes a pivot mounting bracket secured laterally across the vehicle main frame beneath the drive shaft. An auxiliary frame has a first end and a second end and is pivotally mounted at its first end to the mounting bracket. The auxiliary frame thus pivots on a lateral axis relative to the vehicle main frame between a raised position and a lowered load support position, with a portion of the auxiliary frame being constituted as a laterally extending axle member adjacent the second end of the auxiliary frame. The axle member has a first side portion, a second side portion and a drop center portion. The first and second side portions define an axle axis and are connected together by the drop center portion which is offset from the axle axis to accommodate the drive shaft of the vehicle when the auxiliary frame is in the raised position relative to the main frame. Wheel means are coaxially and rotatably mounted along the axle axis of the axle member for engaging a ground surface when the auxiliary frame is in the lowered load support position. Alignment maintaining means are provided for maintaining the auxiliary frame in longitudinal alignment with the vehicle main frame. Pivoting of the auxiliary frame between the raised position and the lowered load support position is controlled by a variable force application means, which preferably consists of fluid pressure means mounted between the main frame and the auxiliary frame.

The present invention is particularly suitable for use on a transit mixer truck vehicle having a rotatable drum thereon which is used for the transport and mixing of cement. When the auxiliary frame is in the raised position, the axle axis of the auxiliary frame is closer to the vehicle's main frame than the pivot axis of the auxiliary frame (adjacent its first end). In addition, when the ground surface is substantially planar and the auxiliary frame is in the raised position, the lowermost portion of the wheel means preferably is at least eleven inches above the ground.

DETAILED DESCRIPTION OF THE PREFERRED EMBODIMENTS

Figure 1:
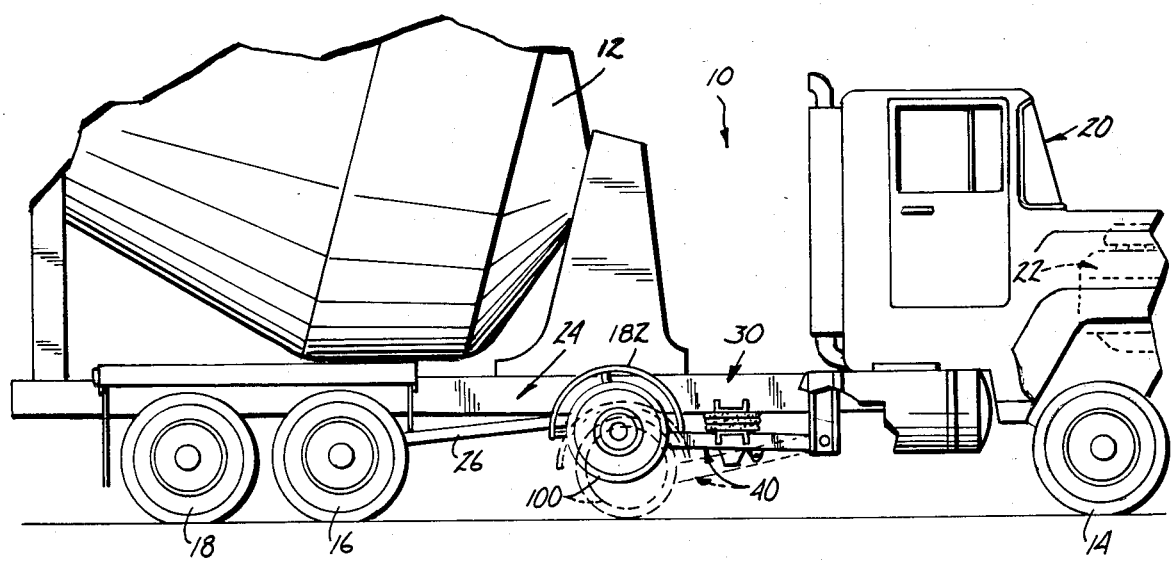
FIG. 1 (Sheet 1) is a partial side elevational view of a transit mixer vehicle or cement truck having a variable load transfer assembly of the present invention.

FIG. 1 (Sheet 1) shows a portion of a vehicle 10 which is a transit mixer truck having a rotatable drum 12 thereon for the transport and mixing of cement. As is typical with such vehicles, the vehicle 10 has forward steerable wheels 14 and rearward drive wheels 16 and 18. Adjacent a forward end of the vehicle is a cab 20 for a vehicle operator and a forwardly placed engine 22 for providing the motive force for the vehicle 10. The wheels 14, 16 and 18 support a main frame 24 of the vehicle 10, with the cab 20, engine 22 and rotatable drum 12 mounted on and supported by the main frame 24.

A drive shaft 26 extends longitudinally beneath the vehicle 10 from the engine 22 to the rearward drive wheels 16 and 18, with the drive shaft 26 being operably connected to the engine 22 and drive wheels 16 and 18 by conventional means (not shown). When the engine 22 is running and engaged with a forward end of the drive shaft 26, the drive shaft 26 is rotated about its axis (which extends generally longitudinally with respect to the vehicle 10 and its main frame 24). A second end of the drive shaft 26 is operably connected to the drive wheels 16 and 18 such that rotation of the drive shaft 26 causes rotation of the drive wheels 16 and 18 thereby leading to movement of the vehicle 10.

Figure 2:
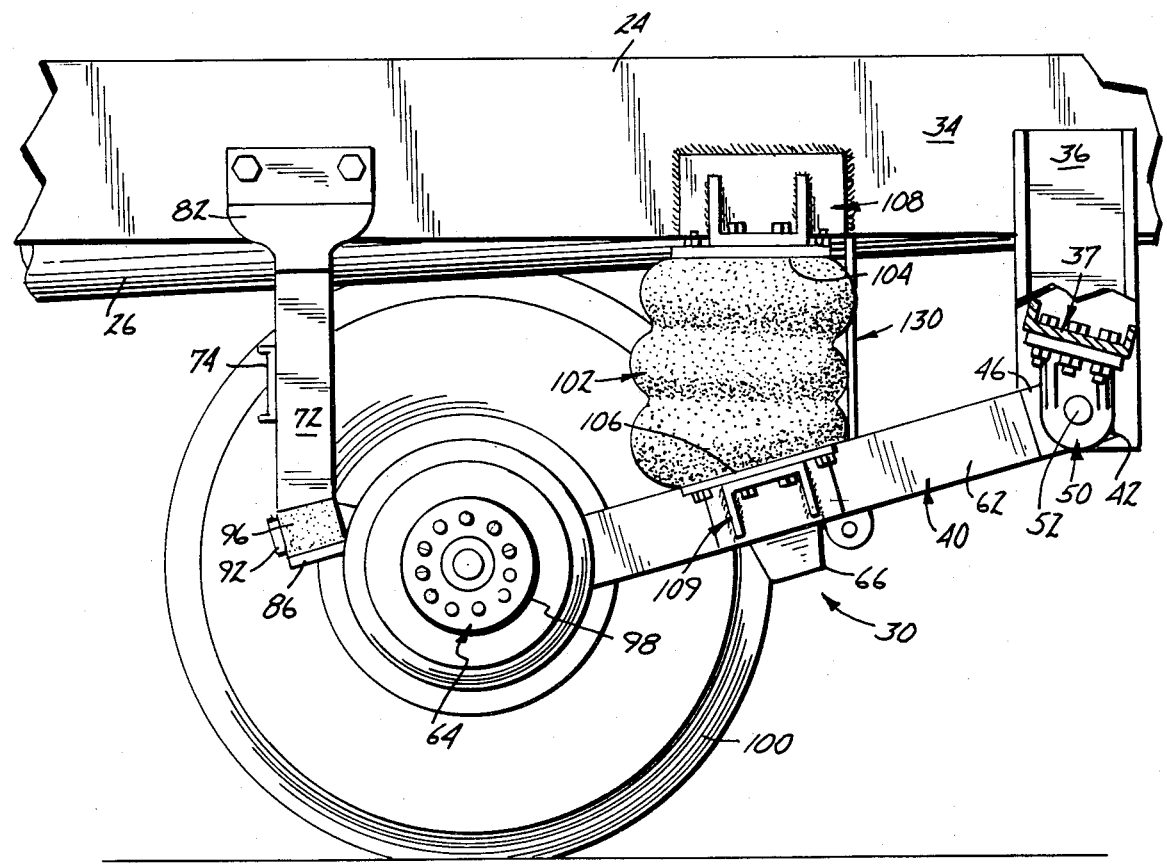
FIG. 2 (Sheet 1) is an enlarged side view of the variable load transfer assembly of the present invention with some parts removed and some parts shown in section.

A variable load transfer assembly 30 is mounted on the main frame 24 of the vehicle 10 forwardly of the rearward drive wheels 16 and 18. The main frame 24 has first and second longitudinally extending side rails 33 and 34. As shown in FIGS. 2 (Sheet 1) and 3 (Sheet 2), first and second generally vertically extending brackets 35 and 36 are secured to and extend downwardly from the first and second side rails 33 and 34, respectively. The transfer assembly 30 includes a pivot mounting bracket 37 secured laterally across the vehicle main frame 24, as shown. The pivot mounting bracket 37 is secured to lower ends of the first and second vertically extending brackets 35 and 36 to extend laterally under the vehicle 10 beneath its drive shaft 26.

Figure 3:
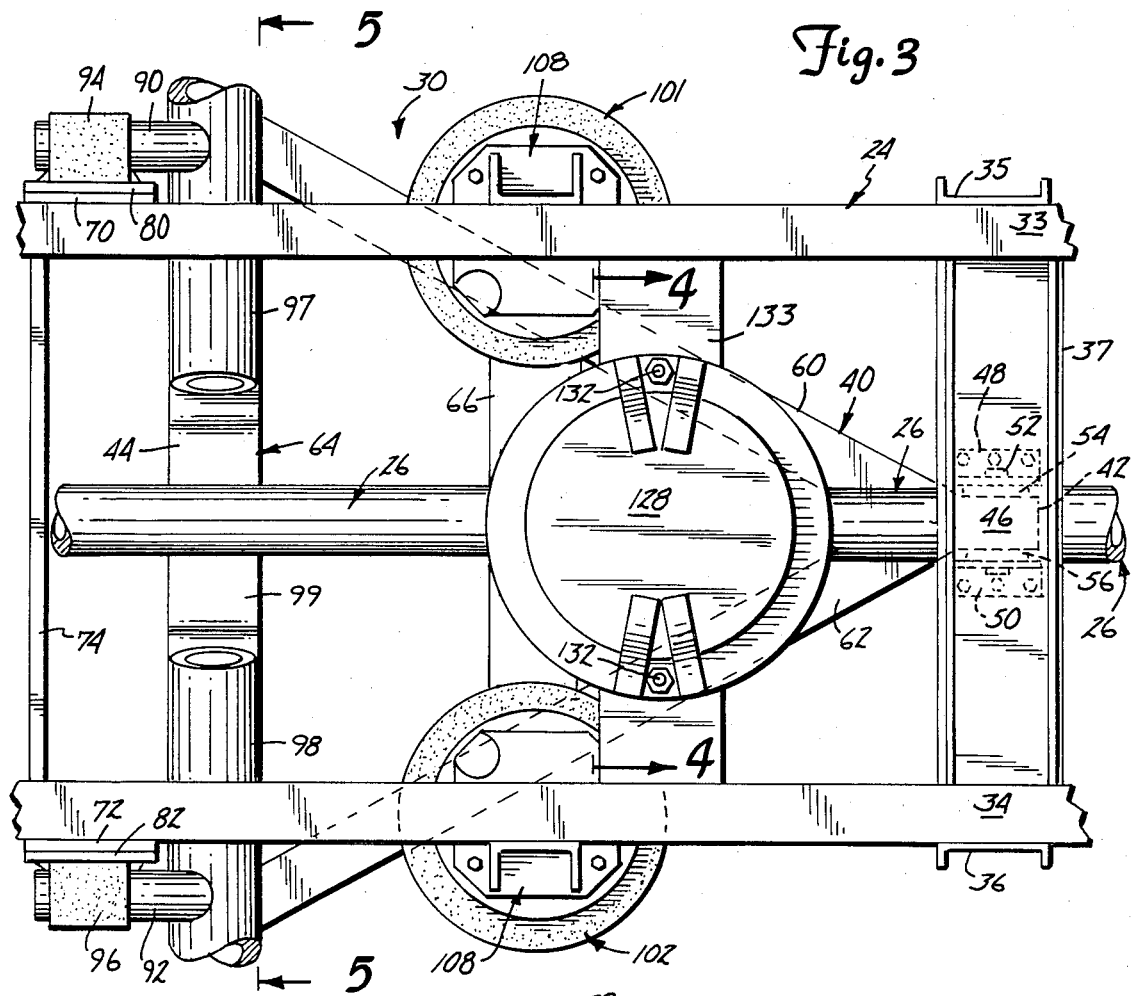
FIG. 3 (Sheet 2) is a top plan view of a portion of the variable load transfer assembly of the present invention.
Figure 4:
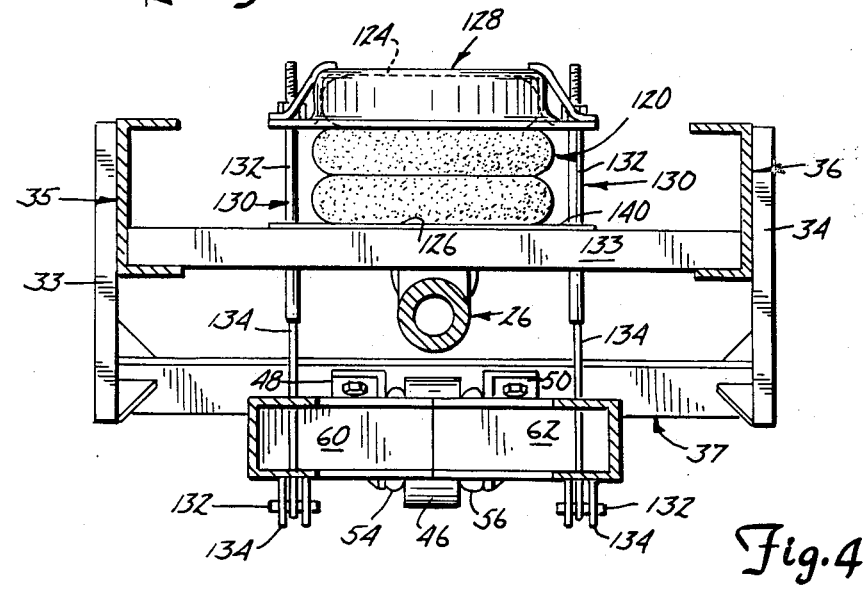
FIG. 4 (Sheet 2) is a sectional view as taken along lines 4—4 in FIG. 3.

An auxiliary frame 40, which has a first end 42 and a second end 44, is pivotally mounted (along a frame pivot axis) adjacent its first end 42 to the pivot mounting bracket 37. A pivot ear 46 comprises the first end 42 of the auxiliary frame 40 and has a generally horizontal aperture therein which is aligned with generally horizontal apertures in a first mounting ear 48 and a second mounting ear 50 for acceptance of a pivot pin 52, as shown in FIGS. 2 and 3. The first and second mounting ears 48 and 50 are secured to a bottom side of the pivot mounting bracket 37 as shown in FIGS. 2, 3 and 4 (Sheet 2). Washer means 54 and 56 are positioned concentrically about the pivot pin 52 between the pivot ear 46 and the first and second mounting ears 48 and 50, respectively, to maintain the auxiliary frame 40 in longitudinal alignment with the main frame 24. This permits the auxiliary frame 40 to pivot on a lateral frame pivot axis relative to the main frame 24 about a generally horizontal axis defined by the pivot pin 52, but permits some small degree of "play" between the auxiliary frame 40 and the main frame 24 to allow for travel and support on uneven terrain.

Rearwardly of the pivot ear 46, the auxiliary frame 40 is formed in a substantially triangular shape (see FIG. 3). Pivot ear 46 is connected to a first angular section 60 and a second angular section 62 which extend rearwardly and outwardly from the first end 42 of the auxiliary frame 40. At their second ends, the first and second sections 60 and 62 are secured to a laterally extending axle member 64. The first and second angular sections 60 and 62 and the axle member 64 are joined together to define the generally triangular shape of the auxiliary frame 40, with the axle member and each angular section being constituted as one of the legs of the triangle. The first and second angular sections 60 and 62 are joined together adjacent the first end 42 of the auxiliary frame 40 and the axle member 64 (as a portion of the auxiliary frame 40) is positioned adjacent the second end 44 of the auxiliary frame 40 (as best shown in FIG. 3). Thus, the first end 42 of the auxiliary frame 40 represents that apex of the triangle (auxiliary frame 40) which is opposite its rearward leg (axle member 64). The entire auxiliary frame 40, including the first and second angular sections 60 and 62 and the axle member 64 are positioned beneath the main frame 24 of the vehicle 10 as shown in FIG. 2. An additional structural brace 66 for the auxiliary frame 40 extends laterally between the first and second angular sections 60 and 62, as shown in FIGS. 2 and 3.

The auxiliary frame 40 pivots relative to the main frame 24 of the vehicle between a raised position (as shown in solid in FIG. 1) and a lowered load support position (as shown in phantom in FIG. 1). The auxiliary frame 40 is maintained in longitudinal alignment when in the raised position, the lowered load support position and all positions therebetween by its pivotal mounting arrangement adjacent its first end 42 and an alignment maintaining assembly adjacent its second end 44.

Figure 5:
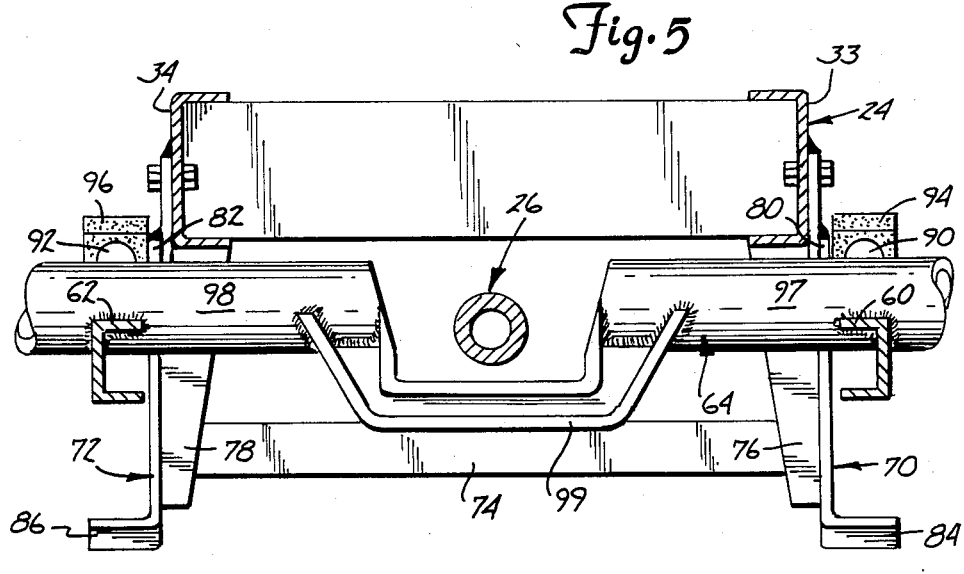
FIG. 5 (Sheet 3) is a sectional view as taken along lines 5—5 in FIG. 3.

The alignment maintaining assembly comprises a plurality of pivot guides, which preferably include first and second guide plates 70 and 72 extending downwardly from the first and second side rails 33 and 34, respectively. The guide plates 70 and 72, best shown in FIGS. 2, 3 and 5 (Sheet 3), are secured together below the main frame 24 by a lateral brace 74. The guide plates 70 and 72 are additionally secured to their respective longitudinally extending side rails 33 and 34 by bolsters 76 and 78. Raised shim plates 80 and 82 are secured on the outer sides of the first and second guide plates 70 and 72 adjacent their upper ends, respectively, as shown in FIGS. 2 and 5. The first and second guide plates 70 and 72 have footings 84 and 86 adjacent their lower ends, as also best shown in FIGS. 2 and 5.

First and second guide posts 90 and 92 extend rearwardly from each side of the axle member 64 of the auxiliary frame 40, as best shown in FIG. 3. Secured about the guide posts 90 and 92 are guide blocks 94 and 96, respectively. The guide blocks 94 and 96 are positioned in close slidable longitudinal alignment with their respective guide plates 70 and 72, as best shown in FIGS. 3 and 5. As the auxiliary frame 40 is pivoted between its raised position and lowered load support position, the guide blocks 94 and 96 are continually in contact with their respective guide plates 70 and 72 to maintain the alignment of the auxiliary frame 40 with the main frame 24 of the vehicle 10. In addition, when the auxiliary frame 40 is pivoted to its raised position (as shown in solid in FIG. 1) the raised shim plates 80 and 82 provide snug surfaces for their respective guide blocks 94 and 96 to limit side-to-side movement of the auxiliary frame 40 relative to the main frame 24.

The footings 84 and 86 provide a downward limit for the extent of movement of the guide blocks 94 and 96 along their respective guide plates 70 and 72. This in turn limits the extent of pivot by the auxiliary frame 40 downwardly away from the vehicle main frame 24. In FIG. 2, the auxiliary frame 40 is shown pivoted to its lowermost position wherein guide block 96 abuts footing 86 adjacent the lower end of guide plate 72. FIG. 5 shows the auxiliary frame 40 in its raised position wherein the guide blocks 94 and 96 are in contact with their respective shim plates 80 and 82. Preferably, the guide blocks 94 and 96 are formed of a rubber-like material which is resilient enough to aid in absorbing shocks and torsion forces exerted by the auxiliary frame 40 on the guide plates 70 and 72 but rigid enough to maintain the auxiliary frame 40 in alignment under the main frame 24.

The laterally extending axle member 64 comprises three sections: a first side portion 97, a second side portion 98 and a drop center portion 99 (see FIG. 5). The first and second side portions 97 and 98 define a laterally extending axle axis for the axle member 64 and are connected together by the drop center portion 99. The drop center portion 99 is offset downwardly from the axle axis and has a generally U-shaped configuration (see FIG. 5). The axle member 64 of the auxiliary frame 40 is formed with the drop center portion 99 to accommodate the drive shaft 26 of the vehicle 10 when the auxiliary frame 40 is in the raised position relative to the main frame 24. As described and shown, the three sections of the axle member 64 are secured together to form a unitary axle secured to (and actually a part of) the auxiliary frame 40. A rotational axis for this unitary axle is defined by the axle axis of the first and second side portions 97 and 98. Preferably, a wheel 100 is rotatably mounted on each side portion 97 and 98 of the axle member 64. The wheels 100 are coaxially mounted along the axle axis of the axle member 64 for engaging a ground surface when the auxiliary frame 40 is in the lowered load support position. By forming the axle member 64 in the manner described and shown, the upward extent of the pivoting of the auxiliary frame 40 when in the raised position is limited not by the vehicle's drive shaft 26, but by the bottoms of the first and second longitudinally side rails 33 and 34 of the vehicle's main frame 24.

When in the raised position, the drop center portion 99 actually permits the second end 44 of the auxiliary frame 40 to be higher than its first end 42 (as shown in solid in FIG. 1). This relative difference in height is achieved because the frame pivot axis of the auxiliary frame 40 is farther from the vehicle's main frame 24 than the axle axis when the auxiliary frame 40 is in the raised position.

Variable force application means control the pivoting of the auxiliary frame 40 between its raised position and its lowered load support position. Preferably, the variable force application means is a pneumatic system comprising separate air pressure application means for raising and lowering the auxiliary frame 40 relative to the main frame 24. A first fluid pressure means is mounted between the vehicle main frame 24 and the auxiliary frame 40 for pivoting the auxiliary frame 40 from the raised position to the lowered load support position, and a second fluid pressure means is mounted between the vehicle main frame 24 and the auxiliary frame 40 for pivoting the auxiliary frame 40 from the lowered load support position to the raised position. The first and second fluid pressure means are preferably pneumatic expansion elements or bellows-type air springs which are operably connected for simultaneous reverse operation. That is, as the air springs of the first fluid pressure means are filled with air to expand, the air springs of the second fluid pressure means are exhausted of air to contract, and vice versa.

The first fluid pressure means, which operates to pivot the auxiliary frame 40 downwardly, includes a pair of first air springs 101 and 102, with each air spring having a first end 104 and a second end 106, as shown on first air spring 102 in FIG. 2. The first or upper end 104 of each first air spring 101 and 102 is sealably secured to an upper mounting plate 108 which, in turn, is secured to one of the side rails 33 and 34 of the vehicle main frame 24, as shown in FIG. 3. The second or lower end 106 of each first air spring 101 and 102 is sealably secured to a lower mounting plate 109 which, in turn, is secured to the auxiliary rame 40. As shown in FIG. 2, the mounting plate 109 for the first air spring 102 is secured to the second angular section 62 of the auxiliary frame 40. Although not specifically shown, the mounting plate 109 for the first air spring 101 is similarly secured to the first angular section 60 of the auxiliary frame 40.

The second fluid pressure means, which operates to pivot the auxiliary frame 40 upwardly, includes a second air spring 120 which has a first end 124 and a second end 126, as shown in FIG. 4. The first or upper end 124 of the second air spring 120 is covered by and sealably secured to a hood 128. The hood 128 is, in turn, secured to the auxiliary frame 40 by a plurality of inextensible links 130. Each link 130 preferably comprises a rod 132 which is fastened at its upper end to the hood 128. Each rod 132 extends downwardly from the hood 128 through an air spring support plate 133, as shown in FIGS. 3 and 4. A cable 134 is fixed to a lower end of each rod 132 and a lower end of each cable 134 is, in turn, secured to the auxiliary frame 40. The air spring support plate 133 is apertured to permit movement of the rods 132 in the generally vertical direction through the support plate 133. As shown in FIGS. 3 and 4, there are two inextensible links 130, with the cables 134 thereof extending generally vertically through the first and second angular sections 60 and 62 of the auxiliary frame 40. Each cable 134 is fastened to the underside of its respective angular section 60 or 62 by suitable fastening means, such as a pin 136 about which the cable is looped, which in turn, is secured in a mounting yoke 138 on its respective angular section 60 or 62.

The second or lower end 126 of the second air spring 120 is sealably secured to a mounting plate 140. The mounting plate 140 is secured to an upper surface of the air spring support plate 133 which extends laterally between the first and second side rails 33 and 34 above the drive shaft 26, as shown in FIGS. 3 and 4. Through the inextensible links 130, the hood 128, the second air spring 120 and the mounting plate 140, the air spring support plate 133 supports a portion of the weight of the auxiliary frame 40 when the wheels 100 are not in contact with the ground.

Figure 6:
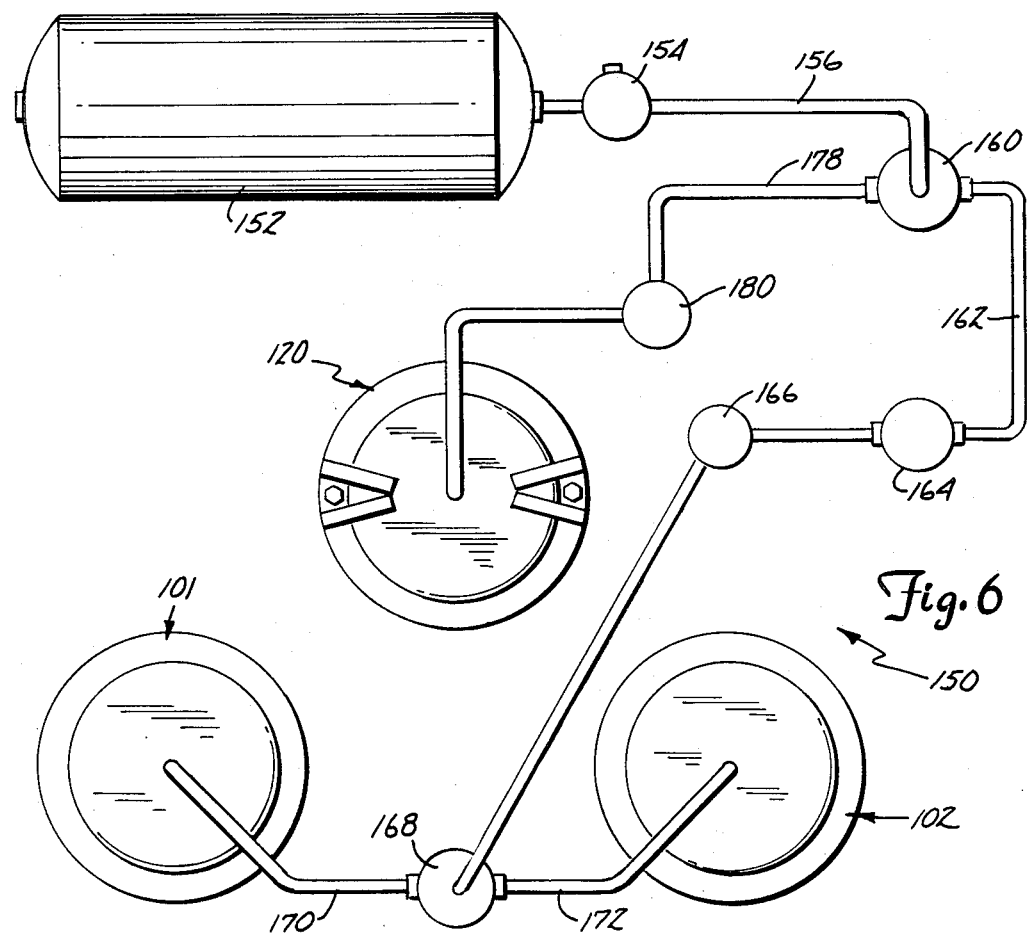
FIG. 6 (Sheet 3) is a schematic diagram illustrating the pneumatic flow lines and controls for the variable load transfer assembly of the present invention.

The first air springs 101 and 102 and the second air spring 120 preferably comprise bellows-type air-tight bags that expand when they are filled with air but collapse when exhausted of air. The air springs are supplied with compressed air from a closed air supply system 150 on the vehicle 10. As shown in FIG. 6 (Sheet 3), the air supply system 150 has a compressed air reservoir tank 152 for storing the high energy air for use by the air springs and is charged or supplied with compressed air from an external source (not shown) through a pressure feed valve 154. The pressure feed valve 154 is in air line 156, which connects the reservoir 152 with a pressure transfer valve 160. The pressure transfer valve 160 is a directional flow valve having two outlets. Compressed air entering the valve 160 from air line 158 is diverted by the valve 160 into one or the other of the two outlets, depending upon the position of the valve 160. The transfer valve 160 is controlled by manual means, such as a two position lever (not shown) with one position setting the valve to divert compressed air to the first fluid pressure means (first air springs 101 and 102) and the second position setting the valve to divert compressed air flow to the second fluid pressure means (second air spring 120).

The transfer valve 160 is connected through one of its outlets to an air line 162. A pressure regulator valve 164 and an air pressure gauge 166 are positioned on air line 162 as shown. The pressure regulator valve 164 also has manual control means (not shown) which, upon manipulation, controls the pressure of the compressed gas allowed to flow past the regulator valve 164. The air pressure gauge 166 provides a visible indication of the pressure in the air supply system 150. From the air pressure gauge 166, the air line 162 leads to a quick release valve 168, which in turn is connected in parallel to the first air springs 101 and 102 by air lines 170 and 172, respectively.

When the transfer valve 160 is set to feed compressed air to the first fluid pressure means, compressed air is fed through the air line 162 to the pressure regulator valve 164, which effectively establishes the pressure of the compressed air being fed to the first fluid pressure means. From the pressure regulator valve 164, the compressed air flows through air line 162, past the air pressure gauge 166 to the quick release valve 168. At the quick release valve 168, the compressed air is diverted to both first air spring 101 (through air line 170) and the second air spring 102 (through air line 172). The introduction of compressed air into the first and second air springs 101 and 102 causes those air springs to expand, thereby exerting a force tending to pivot the auxiliary frame 40 downwardly relative to the vehicle main frame 24. The first air springs 101 and 102 are caused to expand simultaneously in a generally vertical direction so that the force exerted by the first air springs 101 and 102 on the auxiliary frame 40 is uniform.

When the transfer valve 160 is set to feed compressed air to the second fluid pressure means, compressed air is fed trough air line 178 past an exhaust valve 180. The exhaust valve 180 acts to exhaust any excess air from the air supply system 150. From the exhaust valve 180, the compressed air flows through air line 178 to the second air spring 120. The introduction of compressed air into the second air spring 120 causes that air spring to expand, thereby exerting a force tending to pivot the auxiliary frame 40 upwardly relative to the main frame 24. The second air spring 120 expands in a generally vertical direction, forcing the hood 128 upwardly relative to the main frame 24. This movement of the hood 128 pulls the auxiliary frame 40 upwardly (via inextensible links 130) to cause the auxiliary frame 40 to move toward and into its raised transfer position.

As stated, the first and second fluid pressure means are operably connected for simultaneous reverse operation. Thus, when compressed air is introduced into the second air spring 120, the valving arrangement of the air supply system 150 permits air to escape from the first air springs 101 and 102 through the air supply system 150. In addition to relieving the air pressure in the first air springs 101 and 102, the movement of the auxiliary frame 40 upwrdly toward the main frame 24 (caused by expansion of the second air spring 120) squeezes the air out of the first air springs 101 and 102. This system operates in reverse when compressed air is introduced into the first air springs 101 and 102. In that instance, air in the expanded second air spring 120 is permitted to escape into the air supply system 150 and the movement of the auxiliary frame 40 downwardly away from the main frame 24 (caused by the expansion of the first air springs 101 and 102) causes the hood 128 to be moved downwardly toward the air spring support plate 142 thereby collapsing the second air spring 120 to squeeze the air therein back into the air supply system 150.

When the variable load transfer assembly 30 is in its lowered load support position, its wheels 100 are in contact with the ground and the transfer assembly 30 supports a portion of the weight of vehicle 10 and its load. The bulk of this partial support is provided by the force of the expanded first air springs 101 and 102. That portion or amount of the weight of the vehicle 10 which is supported by the transfer assembly 30 is determined by the amount of pressure in the first air springs 101 and 102. The air pressure in those first air springs 101 and 102 is selectively controlled through the pressure regulator valve 164. As the air pressure in the first air springs 101 and 102 is increased, the auxiliary frame 40 is forced downwardly away from the main frame 24 with a proportionally greater degree of force (with the downward travel of the auxiliary frame 40 limited, of course, by the position of the footings 84 and 86 of the alignment maintaining assembly). The urging of the auxiliary frame 40 downwardly by the first air springs 101 and 102 forces the wheels 100 against the ground and provides support for the vehicle 10 in addition to its usual means of support (wheels 14, 16 and 18).

With the specific structures of the present invention as described and shown, a lowermost portion of the wheels 100 can be spaced at least about eleven inches above the ground when the auxiliary frame 40 is in its raised position and the ground is substantially planar. This amount of space between the lowermost portion of the wheels 100 (when raised) and the ground was unachievable with the devices of the prior art, but is critical to the efficient use of a vehicle 10 such as a cement mixer wherein heavy loads must be transported across areas of uneven terrain such as building excavation pits. The pivoting portions of the transfer assembly 30 must be able to be raised as far from the ground as possible to permit movement of the vehicle 10 across ridges and crests, such as are encountered when driving down into an excavation pit. If the transfer assembly 30 does not have enough clearance from the ground, it will contact the ground and "hang up" the vehicle 10 by causing its steerable wheels 14 or its drive wheels 16 and 18 to loose contact with the ground. The ability of the variable load transfer assembly 30 of the present invention to achieve such clearances makes it extremely useful, and even necessary, for most construction projects and excavations.

Because a vehicle employing the transfer assembly 30 of the present invention will often be engaged in construction and excavation projects, a fender 182 is preferably provided over each wheel 100 to keep mud and trash from being thrown up by the wheels 100. The auxiliary frame 40 of the transfer assembly 30 of the present invention can be raised relatively high from the ground so that when the vehicle encounters muddy conditions, the lowermost portions of the transfer assembly 30 (when raised) do not interfer with the movement or turning of the vehicle 10. In addition, the simple and durable structure of the present invention is designed to operate efficiently in such adverse conditions as temperature and moisture climate extremes, muddy roads and excavation pits.

Although the present invention has been described with reference to preferred embodiments, workers skilled in the art will recognize that changes may be made in form and detail without departing from the spirit and scope of the invention.

What is claimed is:

1. In combination with a vehicle of the type wherein forward steerable and rearward drive wheels support the vehicle, the vehicle having a main frame including a pair of spaced longitudinal side rails and a drive shaft extends longitudinally beneath the vehicle between the side rails from a forwardly placed engine to the rearward drive wheels, the improvement being a variable load transfer assembly mounted forwardly of the drive wheels which comprises:

a pivot mounting bracket secured laterally across the vehicle main frame beneath the drive shaft;

an auxiliary frame having a first end and a second end, the auxiliary frame being pivotally mounted at its first end to the mounting bracket to permit the auxiliary frame to pivot on a lateral axis relative to the vehicle main frame between a raised position and a lowered load support position, a portion of the auxiliary frame being constituted as a laterally extending unitary axle member adjacent the second end of the auxiliary frame and the axle member having a first side portion, a second side portion and a drop center portion with the first and second side portions defining an axle axis and being connected together by the drop center portion which is offset from the axle axis to accommodate the drive shaft of the vehicle when the auxiliary frame is in the raised position relative to the main frame;

alignment maintaining means for maintaining the auxiliary frame in longitudinal alignment with the vehicle main frame, the alignment maintaining means including a plurality of pivot guides, each pivot guide having a guide plate secured to one of the side rails to extend downwardly therefrom and a guide block extending rearwardly from the auxiliary frame in close slidable longitudinal alignment with its respective guide plate, and each guide plate having a raised shim plate adjacent its upper end to provide a snug surface for its respective guide block when the auxiliary frame is in the raised position;

a pair of wheels rotatably mounted coaxially along the axle axis of the axle member for engaging a ground surface when the auxiliary frame is in the lowered load support position with a lowermost portion of each wheel being at least about eleven inches above the ground when the auxiliary frame is in the raised position and the ground is substantially planar; and variable force application means for controlling the pivoting of the auxiliary frame between the raised position and the lowered load support position.

2. The combination of claim 1 wherein the auxiliary frame has a first angular section and a second angular section, with the first and second angular sections and the laterally extending axle member being secured together to define a generally triangular shape for the auxiliary frame.

3. The combination specified in claim 1 wherein the auxiliary frame is pivotally mounted to the mounting bracket along a frame pivot axis and the axle axis is closer to the vehicle's main frame than the frame pivot axis when the auxiliary frame is in the raised position.

4. The combination specified in claim 1 wherein the alignment maintaining means includes means for limiting the extent of pivoting of the auxiliary frame downwardly away from the vehicle main frame.

5. The combination specified in claim 1 wherein the vehicle is a transit mixer truck having a rotatable drum thereon for the transport and mixing of cement.

6. The combination specified in claim 1 wherein the variable force application means comprises:

first fluid pressure means mounted between the vehicle main frame and the auxiliary frame for pivoting the auxiliary frame from the raised position to the lowered load support position; and second fluid pressure means mounted between the vehicle main frame and the auxiliary frame for pivoting the auxiliary frame from the lowered load support position to the raised position, and the second fluid pressure means being operably connected to the first fluid pressure means for simultaneous reverse operation.

7. The combination specified in claim 6 wherein the first fluid pressure means comprises:

a pair of first air springs, each first air spring having a first end and a second end;

means for mounting the first ends of the first air springs to the side rails of the vehicle main frame; and means for mounting the second ends of the first air springs to the auxiliary frame, whereby upon expansion, the first air springs exert a force tending to pivot the auxiliary axle downwardly relative to the vehicle main frame.

8. The combination of claim 7 wherein the auxiliary frame has a first angular section and a second angular section, the first and second angular sections and the laterally extending axle member being secured together to define a generally triangular shape for the auxiliary frame with the first and second angular sections being joined together adjacent the first end of the auxiliary frame, and the second ends of the first air springs being mounted on the first and second angular sections of the auxiliary frame.

9. The combination specified in claim 6 wherein a support plate extends laterally between the side rails of the vehicle main frame above the drive shaft and wherein the second fluid pressure means comprises:
- a second air spring having a lower end and an upper end;
- means for mounting the lower end of the second air spring on an upper surface of the support plate; and
- means for connecting the upper end of the second air spring to the auxiliary frame, whereby upon expansion, the second air spring exerts a force tending to pivot the auxiliary frame upwardly relative to the main frame of the vehicle.

10. The combination specified in claim 9 wherein the means for connecting comprises:
- a hood covering the upper end of the second air spring; and
- a plurality of inextensible links secured at their upper ends to the hood and secured at their lower ends to the auxiliary frame.

11. The combination specified in claim 1 wherein the variable load transfer assembly supports a portion of the weight of the vehicle when the auxiliary frame is in its lowered load support position, and further comprising:
- valve control means for selectively controlling the force applied by the variable force application means to control the amount of vehicle weight supported by the variable load transfer assembly.

12. The combination specified in claim 1 wherein the auxiliary frame is shaped substantially as a triangle with one leg thereof being constituted as the laterally extending axle member.

13. The combination specified in claim 12 wherein the first end of the auxiliary frame represents that apex of the triangularly-shaped auxiliary frame which is opposite the axle member of the auxiliary frame.

* * * * *